(12) United States Patent
Seth

(10) Patent No.: US 6,638,611 B2
(45) Date of Patent: Oct. 28, 2003

(54) MULTIPURPOSE COSMETIC WIPES

(75) Inventor: Jayshree Seth, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/876,709

(22) Filed: Jun. 7, 2001

(65) Prior Publication Data

US 2002/0155234 A1 Oct. 24, 2002

Related U.S. Application Data

(63) Continuation-in-part of application No. 09/780,094, filed on Feb. 9, 2001.

(51) Int. Cl.⁷ .................................................. A47K 7/00
(52) U.S. Cl. ............................... 428/304.4; 428/311.11; 428/359; 428/397
(58) Field of Search ......................... 428/304.4, 311.11, 428/359, 397

(56) References Cited

U.S. PATENT DOCUMENTS

| | | | |
|---|---|---|---|
| 1,205,892 A | 11/1916 | Hecht | 221/37 |
| 2,032,150 A | 2/1936 | Richardson | 206/57 |
| 2,269,525 A | 1/1942 | Fleischer | 206/57 |
| 2,341,794 A | 2/1944 | Kliwer | 206/57 |
| 2,885,112 A | 5/1959 | Willat | 221/33 |
| 3,825,379 A | 7/1974 | Lohkamp et al. | 425/72 |
| 3,971,373 A | 7/1976 | Braun | 128/146.2 |
| 4,279,890 A | 7/1981 | Harris et al. | 424/69 |
| 4,532,937 A | 8/1985 | Miller | 128/759 |
| 4,574,952 A | 3/1986 | Masui | 206/494 |
| 4,587,154 A | 5/1986 | Hotchkiss et al. | 428/195 |
| 4,643,939 A | 2/1987 | Sugiyama et al. | 428/283 |
| 4,725,489 A * | 2/1988 | Jones et al. | 428/289 |
| 4,726,989 A | 2/1988 | Mrozinski | 428/315.5 |

(List continued on next page.)

FOREIGN PATENT DOCUMENTS

| | | |
|---|---|---|
| EP | 0 821 153 B1 | 1/1998 |
| EP | 1066826 | 1/2001 |
| GB | 2 061 709 | 5/1981 |
| JP | 56-8606 | 1/1981 |
| JP | 58-74894 | 5/1983 |
| JP | 4045591 | 2/1992 |
| JP | 5-18392 | 1/1993 |
| JP | 6319664 | 11/1994 |
| WO | WO 9318988 A1 * | 9/1993 |
| WO | WO 99/29220 | 6/1999 |
| WO | WO 01/85001 | 11/2001 |

OTHER PUBLICATIONS

Wente Van A., "Superfine Thermoplastic Fibers", *Industrial Engineering Chemistry*, vol. 48, p. 1342 et seq. (1956).
Wente et al., "Manufacture of Superfine Organic Fibers", Report No. 4364 of the Naval Research Laboratories, published May 25, 1954.
U.S. application Ser. No. 09/566,308 (*3M Ref: 54943USA2A.002*).
U.S. application Ser. No. 09/585,649 (*3M Ref: 55601USlA2A.002*).
U.S. application Ser. No. 09/582,838 (*3M Ref: 53859USA2A.008*).
U.S. application Ser. No. 09/780,094 (*3M Ref: 56167USA6A,002*).
U.S. application Ser. No. 09/780,257 (*3M Ref: 56052USA9A.002*).

*Primary Examiner*—Sandra M. Nolan
(74) *Attorney, Agent, or Firm*—Gary L. Griswold; Robert W. Sprague; William J. Bond

(57) ABSTRACT

There is provided a package of multiple oil absorbing wipes suitable for wiping a users skin or hair. The invention wipes comprise an oil absorbing porous film of a thermoplastic material having a transparency of less than 65 which porous substrate changes transparency when loaded with oil. The porous substrate has directly on one face an oil contaminable layer, without any intermediate oil impermeable layer or film. The porous film has a percent oil retention of from 50 to 100 percent.

28 Claims, 3 Drawing Sheets

U.S. PATENT DOCUMENTS

| | | |
|---|---|---|
| 4,739,902 A | 4/1988 | Joslyn et al. .................. 221/37 |
| 4,755,178 A | 7/1988 | Insley et al. ................. 604/367 |
| 4,818,463 A | 4/1989 | Buehning .................... 264/40 |
| 4,907,174 A | 3/1990 | Priem ......................... 364/521 |
| 4,986,743 A | 1/1991 | Buehning ..................... 425/7 |
| 5,046,640 A | 9/1991 | Carroll ....................... 221/213 |
| 5,119,828 A | 6/1992 | Miller ........................ 128/760 |
| 5,144,744 A | 9/1992 | Campagnoli .................. 29/446 |
| 5,184,725 A | 2/1993 | Reinheimer et al. ......... 206/494 |
| 5,744,149 A | 4/1998 | Girardot ..................... 424/402 |
| 5,935,521 A | 8/1999 | Khazaka ...................... 422/61 |
| 6,214,362 B1 | 4/2001 | Page .......................... 424/402 |
| 6,322,801 B1 * | 11/2001 | Lorenzi et al. ............. 424/402 |

* cited by examiner

MULTIPURPOSE COSMETIC WIPES

This application is a continuation-in-part of U.S. application Ser. No. 09/780,094 filed Feb. 9, 2001.

BACKGROUND OF THE INVENTION

This invention relates to oil absorbent skin wipe products. The invention particularly relates to dispensable packages of oil absorbent skin wiping products.

A significant amount of oil continuously oozes out of the skin of the face, particularly the nose, cheek and forehead. To maintain cleanliness, reduce shine and to improve the spreadability of cosmetics and other skin products it is important to remove any excess surface oil or sebum. Soap and water work to some extent but there are always times when one is not able to wash. Dry methods of removing these facial oils include the use of thin oil absorbent wipe materials. Oil absorbing wipes for removing facial oil have also been described in the art. These wipes generally must be thin, conformable and non-abrasive, considerations not relevant to industrial oil absorbent materials.

Conventional paper type wipes have been used to remove facial oil. For example, natural or synthetic papers using vegetable fibers, synthetic pulp or kenaf have been used. These oil absorbent papers however are often irritating to the skin due to the hard and stiff nature of the fibers. To improve their smoothness, these papers have been continuously calendered and/or coated with powders such as calcium carbonate and sizing agents. Calendering however is not necessarily permanent and surface fibers can reform into a rough surface unless substantial amounts of binder or sizing agents are used, which decrease oil absorption. Paper wipes are also poor indicators as to their effectiveness, as papers generally do not significantly change appearance when they have absorbed oil or sebum.

Improvements to oil absorbing papers are described in Japanese Kokai No. 4-45591 which teaches adhering porous spherical beads onto the surface of an oil absorbing paper so as to solve the problems caused by calendering or coating of paper with powders such as calcium carbonate powders. These beads also are used to allegedly increase the capacity of the papers to absorb sebum. Japanese Unexamined Patent Publication (Kokai) No. 6-319664 discloses a high-density oil absorbing paper produced by mixing (a) a pulp material containing vegetable fibers, as the main component with (b) an inorganic filler, followed by paper-making to form a paper with a basis weight of 0.7 g/cm² or more. However, the oil absorbing papers disclosed in these patent publications still have a limited capacity to absorb oil or sebum and little indicating function as there is little change in opacity or color in the paper when oil is absorbed. Difficulty in confirming oil removal means that users of the oil clearing paper can not evaluate if or how much sebum is removed from the users' face when using the oil absorbing paper such that makeup and the like can be applied with confidence.

An oil absorbing paper for sebum is also disclosed in Japanese Examined Patent Publication (Kokoku) No. 56-8606, or U.S. Pat. No. 4,643,939, which describes a cosmetic oil absorbing paper produced by mixing hemp fibers with 10 to 70% by weight of polyolefin resin fibers and making a paper with a basis weight of from 12 to 50 g/cm². This paper will allegedly clear upon absorption of oil but still requires conventional papermaking techniques and would be rough to the touch. Japanese Unexamined Utility Model Publication (Kokai) No. 5-18392, discloses an oil absorbing synthetic paper comprising an oil absorbing paper with a smooth surface coating of inorganic or organic powder material such as clay particles, silica fine-particles, and powdered fibers. These oil-absorbing papers allegedly have some oil indicating effect by clarifying the paper upon oil absorption thus confirming oil absorption. However, the powder coating lowers the oil absorption capacity for these papers and it is still difficult to attain a clear change in the appearance of this type of oil clearing paper after oil absorption.

Japanese Unexamined Patent Publication (Kokai) No. 9-335451 (WO99/29220) discloses an oil wipe made of a porous thermoplastic film. This oil absorbing wipe film has higher oil absorption capacity than the oil absorbing papers and is also superior in confirming removal of oil following wiping as compared to oil absorbing papers. It is believed that the reason for this good oil removal indicating functionality is that these porous thermoplastic films exhibit low light transmittance before oil absorption because of irregular reflection of light, but the light transmittance increases substantially after the micro-pores of the film are filled with oils producing a large change in the film's opacity or light transmittance, and therefore appearance. This change in opacity clearly confirms to the user the removal of oil or sebum from his or her skin. Further, unlike the paper products, these film based wipes are soft, comfortable, smooth and nonirritating to the skin. It is often desired to apply products to or treat the skin after removal of oil with the same wipe which can be complicated by the oil removed from the skin.

European Patent No. 1,066,826 proposes a skin cleansing sheet with an oil absorbing layer and an aqueous skin cleansing layer. Although porous thermoplastic films are disclosed as possible oil absorbing layers, the preferred oil absorbents are nonwoven lipophilic fiber fabrics which contain a powder such as silica. The aqueous skin cleansing layer is also preferably a nonwoven fabric containing a lotion or cleansing liquid. Separating the oil retaining layer from the aqueous skin cleaning layer is a liquid impermeable layer which, in part, prevents the migration of oil from the oil retaining layer to the skin cleansing layer. This construction is complicated and expensive.

It is an object of the invention to form an oil absorbing wipe having a clear oil indicating function, such as described in WO99/29220, which is easily dispensable from a package, which wipe can also have on an opposite face a layer that can be contaminated by oil, which layer is usable following oil removal from the skin.

BRIEF SUMMARY OF THE INVENTION

The invention is directed to a package of multiple oil absorbing wipe materials suitable for wiping a users' skin or hair. The multiple wipes are arranged in an overlying arrangement and the individual wipes comprise at least an oil absorbing porous film of a thermoplastic material. Generally, the wipe has an initial transparency of about 65 or less, which porous substrate changes transparency by at least 10 (as defined herein) when loaded with oil. Further, the wipe porous film has on one face a layer of a porous or pattern coated material or layer that can be contaminated by oil. The macroporous or pattern coated layer can be used on the skin or hair following oil removal without oil contamination by the absorbed oil in the oil absorbing porous film.

DETAILED DESCRIPTION

The invention is generally directed at a dispensable package of oil absorbing wipes of a thermoplastic film porous material. The individual wipes are in the package in a stacked arrangement. By stacked it is meant that a face of one wipe will be over all, or substantial portion of one face, in continuous contact with all, or a substantial portion of, a face on an adjacent wipe in the package. Generally, the package will contain at least 2 or more individual wipes, preferably 10 to 1000.

Figure 1:
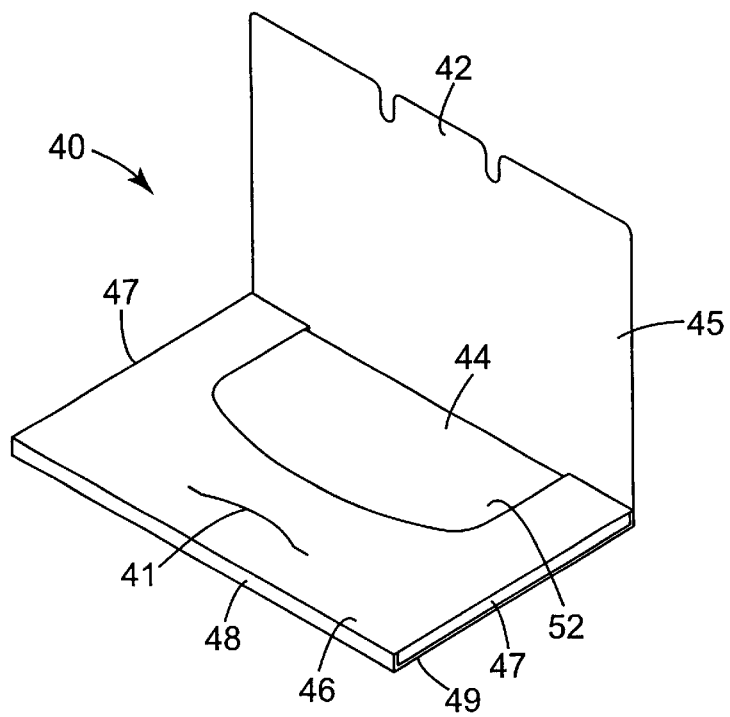
FIG. 1 is a perspective view of a dispensable package of oil absorbing wipes.

Referring to FIG. 1, a dispensable package of oil wipes in accordance with the invention can comprises a dispensable package 40 including individual wipes 44 of oil absorbent wipe material. The package 40 generally comprises a top wall 46 and bottom wall 49, generally parallel to one another, and two side walls 47. A front edge 48 is provided where the back edge is formed into a flap 45, which can be folded down onto the upper face 46 of the package 40. The flap 45 can engage with the package 40 by use of an adhesive or the like, provided as is known in the art. Alternatively, a tab 42 engageable within a slot 41 can be used as a macro-mechanical type closure. Other conventional methods known in the art include the use of cohesive materials, hook and loop fasteners, living hinges, snaps and the like to keep the flap 45 in place to cover the access opening 52 to the wipes. The dispensable package 40 contains an access opening 52 which permits a user to grasp an individual wipe and withdraw it from the package 40 for use. Generally, the access opening 52 is at its largest dimension, smaller than the largest length or width dimension of the dispensable oil absorbing wipe material or wipe.

Figure 5:
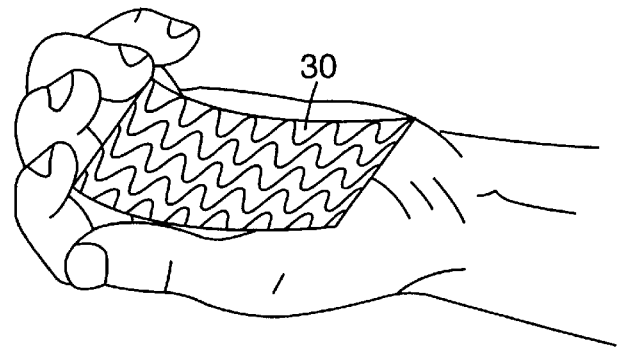
FIG. 5 is a perspective view of an invention wipe in use.
Figure 6:
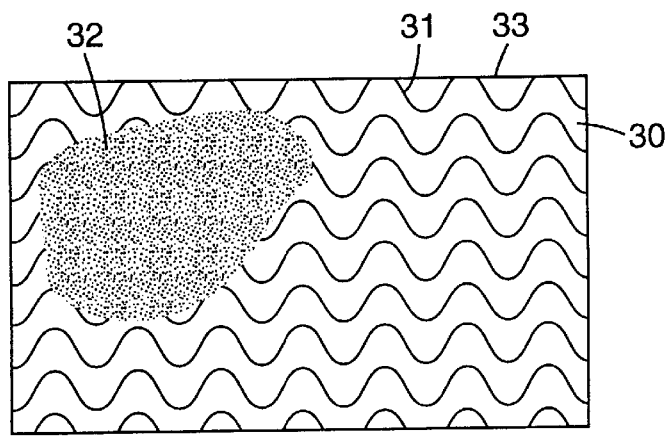
FIG. 6 is a top view of an invention wipe after it has been used.

The individual oil absorbing wipes of the invention can be provided with an embossing pattern. The embossed areas collapse, at least partially, the porous structure of the thermoplastic wipe material. This embossing increases the transparency of the wipe in the embossed areas. The overall effect is a visible pattern where the embossed areas are below the plane of the wipe face formed by the unembossed areas, for example 5 to 50 $\mu$ below the wipe outer face. This reduces the overall surface contact of a wipe relative to an overlying or underlying wipe in the package. This reduced surface contact between adjacent wipes increases the dispensability of the wipes in a package by decreasing the bond level between the wipes. This is particularly effective where the wipe is or rendered hydrophilic. The patterned embossing also reduces a wipe's rigidity, improving the texture and feel of the wipe. The embossing pattern's increased transparency also provides a visual reference as to what the wipe should appear like following oil absorption. As shown in FIGS. 5 and 6, where the wipe 30 has embossing elements 31 which are relatively transparent compared to nonembossed areas 33, the portion used 32 to absorb oil, after use resembles the embossed areas 31 (i.e., they have the same or similar levels of transparency).

The embossing pattern can be continuous and/or connected embossing elements such as a grid, connected lines or random connected patterns or the like. The patterns could extend to the edges of the wipes, which substantially improves dispensability. Alternatively, the embossing pattern could be discrete elements such as dots, disconnected patterns or the like. The embossing pattern can be formed by conventional techniques over from 1 to 50% of the surface area of the wipe, preferably 2 to 25% of the wipe surface area, at least in that portion of the wipe outer face that is in continuous contact with an adjacent wipe in a package. The individual embossing elements of the embossing pattern are generally from 0.1 to 10 mm wide at their narrowest dimension, preferably 0.2 to 5. Too wide an embossing element would reduce the oil absorbing ability of the wipe. Too small an embossing element is difficult to see and would not significantly increase dispensability. In general, embossing will take place at a pressure in the range of from about 50 pli to about 500 pli. This provides an embossed area with a transparency at least 30 percentage points more than the nonembossed areas of the wipe, preferably at least 35 percentage point more than the nonembossed areas of the wipe. For a different bond area, the preferred pressure may be obtained by multiplying by the ratio of % areas to maintain constant psi on an individual bond point. The temperature of the embossing device will generally be in the range of from about 40° C. to 170° C.

The oil absorbent wipe is a porous thermoplastic film material; in a preferred embodiment it is a porous stretched or oriented film made of a thermoplastic material. The porous thermoplastic material is then coated on at least a portion of one face with a macroporous or discontinuous agent or material as an oil contaminable layer.

The porosity of the interstitial volume per unit area of the first embodiment porous film material is preferably in the range of 0.0001–0.005 cm$^3$ as calculated by the equation:

Interstitial volume per unit area=[film thickness ($cm$)×1 ($cm$)×1 ($cm$)×void content (%)]/100 (where the void content is the percentage of voids in the porous film).

The "void content" is more specifically defined as the percentage of an amount of filling material, when all of the voids of the porous film are filled with a material of the same composition as the film, with respect to a film with no corresponding voids. The void content of the porous film is preferably in the range of 5–50% and the thickness is preferably in the range of 5–200 $\mu$m.

The porous stretched film may be produced by various different methods using a thermoplastic material as the starting substance. In one preferred method, the film is produced by adding a filler to a translucent crystalline thermoplastic resin, forming a film using conventional methods such as blown extrusion or casting, and then stretching the film to create fine voids therein. Alternatively with some resins, particularly polytetrafluoroethylene, rapid stretching without fillers can create a porous network. These porous stretched thermoplastic films have a large percentage of voids constituting the volume of the wipe compared to conventional paper oil cleaning wipes, and have excellent absorption of skin oils per unit area. Also, since the thermoplastic film has a structure with a uniform distribution of many fine voids, prior to wiping of skin oils from the skin surface it appears non-transparent due to light dispersion by the pore structures. However, after oil absorption the oils fill the voids or pores thus either preventing or reducing the degree of light dispersion. This together with the original opaque or translucent nature of the thermoplastic forming the film allows the oil absorbing effect to be clearly assessed by a change in transparency or opacity.

Examples of generally translucent crystalline thermoplastic resins which can be used as the film forming material for production of the porous stretched thermoplastic film include, but are not limited to, polyethylene, polypropylene, polybutylene, poly-4-methylpentene, polytetrafluoroethylene and ethylene-propylene block copolymer.

Examples of preferred nonparticulate fillers that can be used in combination with the aforementioned thermoplastic resins to provide the fine voids include, but are not limited to, mineral oils, petroleum jelly, low molecular weight polyethylene, soft Carbowax and mixtures thereof. These nonparticulate fillers are preferred as they exhibit transparency upon absorption of oil. Mineral oils are preferred among these fillers because of their relatively low cost. However, additionally conventional particulate based fillers can also be used to form the porous film, such as talc, calcium carbonate, titanium dioxide, barium sulfate, etc.

The aforementioned fillers can be varied within a wide range within the starting thermoplastic resin used for production of the film. The amount of filler used is preferably in the range of 20–60% by weight, and more preferably 25–40% by weight of the starting thermoplastic material. If the amount of filler added to the starting material is under 20% by weight, the void content of the film resulting after stretching is reduced, thus lowering the amount of oil absorption, while if it is above 60% by weight it becomes more difficult to produce flexible coherent films.

Other additives may also be added as necessary in addition to the thermoplastic resin and filler in the production of the porous stretched thermoplastic film. For example, organic acids such as carboxylic acid, sulfonic acid and phosphonic acid, and organic alcohols. As additional suitable additives there may also be mentioned, for example, inorganic and organic pigment, aromatic agents, surfactants, antistatic agents, nucleating agents and the like. In a preferred embodiment, the wipe can be made hydrophilic by suitable melt additives or a coating or surface treatment.

The main starting materials and optional additives are melted and/or combined to form a film, producing a filler-containing thermoplastic film. The melting and mixing step (s) and the subsequent film forming step may be carried out according to known methods. An example of a suitable melt mixing method is kneading with a kneader, and examples of suitable film forming methods are the blown film method and the casting method. The blown film method, for example, can give tube-shaped films by melt mixing the main starting material, etc. and then blowing it up from a circular die. The casting method can give films by melt mixing the main starting material, etc. and then extruding it from a die onto a smooth or patterned chilled roll (cold roll). In a modified form of this casting method, the nonparticulate additives and/or fillers may be removed by washing off or extracting with a suitable solvent after extrusion of the melted mixture onto the chilled roll.

The formed thermoplastic film is then stretched to provide it with fine voids. As with the film forming, the stretching may also be carried out according to known methods, such as uniaxial stretching or biaxial stretching. For example, in the case of biaxial stretching, the stretching in the lengthwise direction may be accomplished by varying the speed of the driving roll, and the stretching in the widthwise direction may be accomplished by mechanical pulling in the widthwise direction while holding both ends of the film with clips or clamps.

The conditions for the film stretching are not particularly restricted, but the stretching is preferably carried out so as to give a void content in the range of 5–50% and a stretched film thickness in the range of 5–200 $\mu$m. If the void content upon stretching of the film is under 5% the amount of oil absorption will be reduced, while if it is over 50% the amount of oil absorption will be too great, making it difficult to clearly assess the oil absorbing effect. Also, if the film thickness is under 5 $\mu$m the amount of oil absorption capacity will be too low and the film will tend to adhere to the face making it more difficult to handle, while if it is over 200 $\mu$m the amount of oil absorption capacity will be too great and the film may feel stiff and harsh against the user's skin.

The stretching ratio for the thermoplastic film is usually preferred to be in the range of 1.5 to 3.0. If the stretching ratio is under 1.5 it becomes difficult to achieve a sufficient void content for oil absorption, while if it is over 3.0 the void content could become too large, causing too much oil absorption.

The average size of the voids formed by stretching of the film is usually preferred to be in the range of 0.2 to 5 $\mu$m. If the void size is under 0.2 $\mu$m it becomes impossible to rapidly absorb enough skin oil to create a clear change in transparency, while if it is over 5 $\mu$m the amount of oil absorption needed to permit a visible change in transparency may be too great.

As mentioned above, the interstitial volume per unit area of the porous stretched thermoplastic film is preferably in the range of 0.0001–0.005 cm$^3$ and more preferably in the range of 0.0002–0.001 cm$^3$, as calculated by the equation defined above. If the interstitial volume of the film is under 0.001 cm$^3$ it becomes difficult for the user to hold the oil cleaning wipe, while if it is over 0.005 cm$^3$ the amount of oil absorption is too great, and it becomes difficult to clearly assess the oil absorbing effect.

The invention oil absorbent wipes are generally characterized by the ability to change from opaque to translucent after absorbing only a moderate amount of oil, such as would be present on a person's skin (e.g., from 0 to 8 mg/cm$^2$). The oil absorbent wipes are particularly useful as cosmetic wipes as after absorbing skin oil at the levels excreted from common sebaceous glands, they will turn translucent, thus indicating that the undesirable oil has been removed and that makeup or other skin treatments can be applied. The oil-indicating effect is provided by an oil absorbing wipe having an initial transparency of about 65 percent or less, preferably 60 percent or less with an ability to change transparency by about 10 percentage points or more, preferably 20 percentage points or more with a relatively low level of oil loading (e.g., 6 mg/cm$^2$). The effect of skin oil absorption on the transparency of the webs was measured using a Gardiner Haze Guard Plus Hazemeter following the procedure in ASTM D1003. The transparency of the webs was measured before and after oil absorption and is reported as percent (%). Transparency with a value of 0 indicates no light transmittance. Upon absorption of oil the transparency value will increase providing an indication to the user that the web has absorbed skin oil. The higher the change, the greater the indication of absorption. A change of greater than about 10 to 20 percentage points is generally needed to provide an effective indication to the user that skin oil has been absorbed. The oil absorbing wipes are further characterized by the ability to retain oil under pressure such that following removal of oil, the oil is not transferred back to the user or onto the functional coating or layer provided on the opposing face of the wipe. Generally, this oil retention ability is characterized by the ability to retain 50 to 100% of oil absorbed at saturation, preferably 80 to 100 percent at a pressure of 100 gms/cm$^2$. Oil saturation is defined as "oil absorbed" as described in the Examples.

The discrete wipe materials are generally separated from one another and provided in a stacked or folded array and the like as is conventionally known for tissue-type papers. Folding can be provided by an interleaving arrangement via v-folds, z-folds or the like. With this type of folding, opposing overlapping ends of adjacent wipes assist in removal of an upper wipe to provide the lower wipe in an engagable form by frictionally pulling the lower wipe up and out through an access opening for subsequent use.

Figure 3:
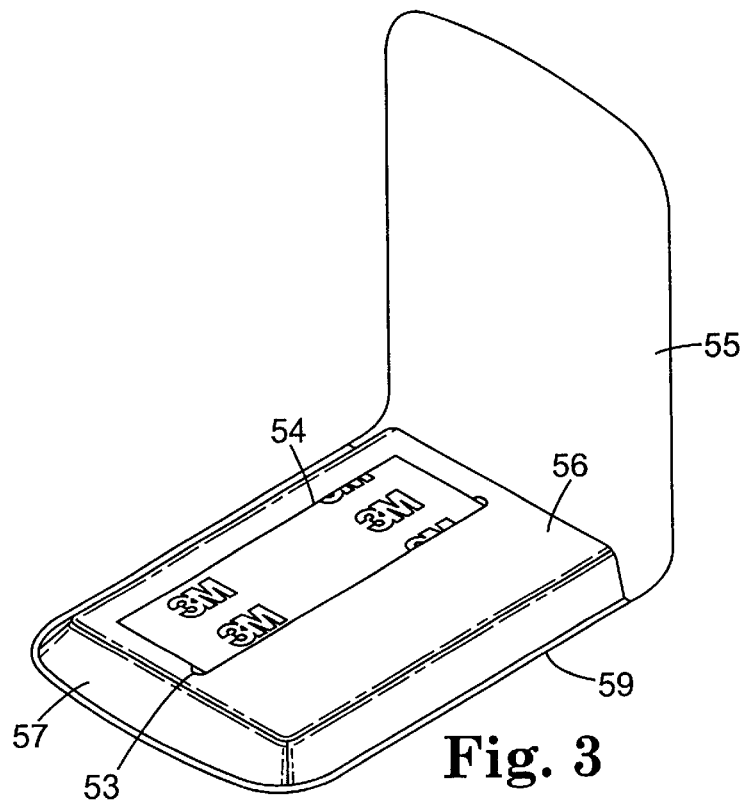
FIG. 3 is a perspective view of a dispensable package of oil absorbing wipes according to a second embodiment.

An alternative embodiment of a dispensable package arrangement for the oil absorbing wipes 54 are shown in FIG. 3, the top wall portion 56 is provided with an access opening slot 53 through which a wipe of oil absorbent wipe material is graspable. In this embodiment, the discrete wipes of wipe material must be interconnected so that the upper wipe can pull the lower wipe up and through the opening 53. This interconnection can be by separate wipes that are folded in an interleaving manner as described above. Alternatively the wipes could be separable wipes as described above; for example; separable wipes can be interconnected through a frangible connection. The movable flap 55 is provided on a sidewall portion and, like the flap in the FIG. 2 embodiment.

Figure 4:
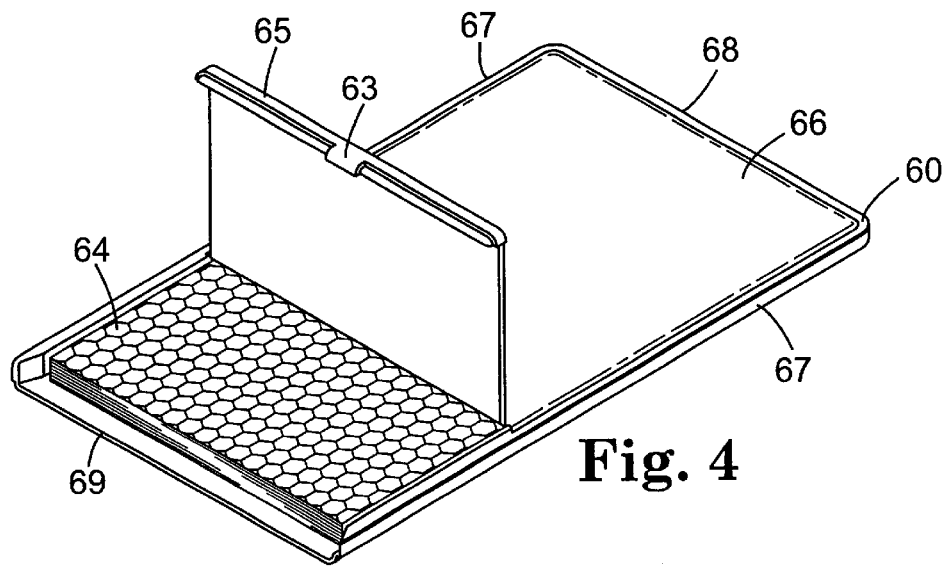
FIG. 4 is a perspective view of a dispensable package of oil absorbing wipes according to a third embodiment.

FIG. 4 shows an alternative embodiment of a dispensable package of the oil absorbent wipes formed with a rigid frame container 60, preferably plastic. The individual wipe materials 64 are contained within the container 60, which has a top wall 66 containing a movable flap 65, which is generally movable by a living hinge. A clasp 63 is provided on the outermost end of flap 65, which clasp 63 engages with the bottom wall 69 to provide for closure of the container 60. Side walls 67 contain the wipes 64 within the container 60 coupled with the upper walls 66 and lower wall 69. End wall 68 is preferably closed. In this embodiment, the individual wipes of discrete oil absorbent material would generally be stacked as separate wipes in an overlying stack preferably of coextensive wipes. The user would grasp an individual wipe and remove each one separately from the container using the frictional force of their fingers to separate the upper wipe from the immediate lower wipe. The individual wipes would then be used to remove skin oil by wiping over the user's face. Following use, the wipe is easily compacted into a small volume shape for easy disposal.

The individual discrete wipes can be of any suitable size, however, generally for most applications the wipes would have an overall surface area of from 10 to 100 cm$^2$, preferably from 20 to 50 cm$^2$. As such, the wipes would be of a size suitable for insertion in a package, which could easily be placed in the user's purse or pocket. The material forming the dispensable containers is generally not of importance and can be formed of suitable papers, plastics, paper film laminates and the like. The shape of the tissues is generally rectangular; however, other suitable shapes such as oval, circular or the like can be used.

Figure 2:
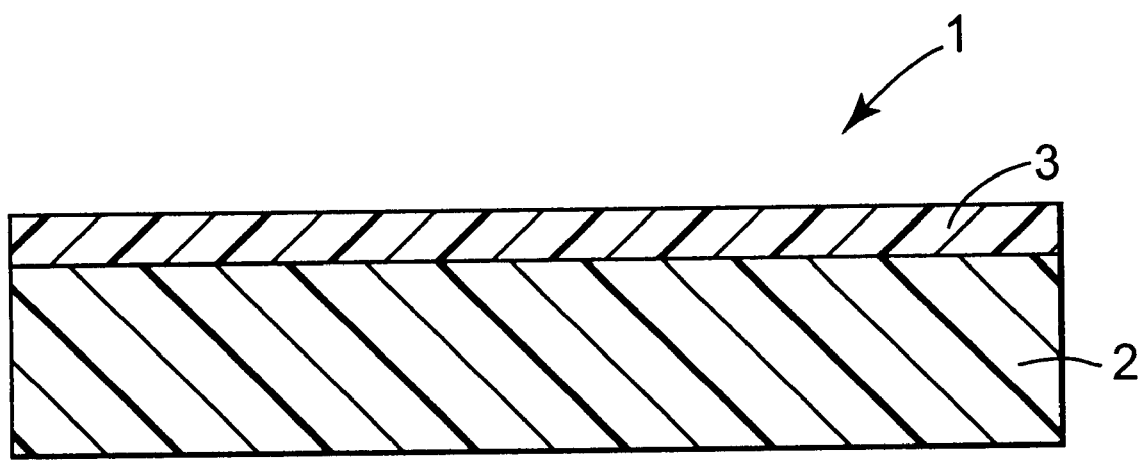
FIG. 2 is a side view of an oil absorbent wipe of the invention.

The oil absorbing wipes 1 of the invention, as shown in FIG. 2, comprises the oil absorbing porous film 2 which has applied directly (without an intermediate barrier layer) onto one face an additional layer 3. This additional layer 3 can contain, or be a coating by, any suitable active or nonactive ingredients or agents. Alternatively, the additional layer 3 can comprise a macroporous substrate or the like, which can contain active or nonactive ingredients or agents. This macroporous substrate is directly laminated or attached to the oil absorbing porous film. This additional layer 3 is characterized in that it can be contaminated by oil ("contaminable") which means that oil, if present in the layer, could interfere with the efficacy, or usability or the like, of the layer and/or its ingredients or agents. Oil contamination, or contaminable, would include effects such as: smearing of powders, transfer of oil through a macroporous or discontinuous layer back to the skin, physical coating of the active agents by oil, chemical reaction of the oil with the agents (e.g., soap) or the like. The active or nonactive ingredients or agents can be coated directly onto the porous film or incorporated into, or coated on, a macroporous substrate that is attached to the porous film as the layer. Particularly useful are various active ingredients or agents useful for delivering various benefits to the skin or hair during and after oil removal and cleansing. The active or nonactive agents can be coated onto the oil absorbing porous film as a continuous or discontinuous coating. The active or nonactive agents can also be coated onto the macroporous substrate if used. Coating of these agents in dry or wet form can be carried out by conventional techniques including, as appropriate, solvent slot coating, dip coating, spray coating, roll coating, gravure coating, melt coating, transfer coating, or the like.

The active ingredients or agents useful herein can be categorized by their therapeutic benefit or their postulated mode of action. However, it is to be understood that the active ingredients useful herein can in some instances provide more than one therapeutic benefit or operate via more than one mode of action. The following active ingredients are possible for use in or as the invention oil contaminable layer. Anti-Acne Actives: examples of useful anti-acne actives include the keratolytics such as salicylic acid (o-hydroxybenzoic acid), derivatives of salicylic acid, retinoids such as retinoic acid and its derivatives (e.g., cis and trans); sulfur-containing D and L amino acids and their derivatives and salts, lipoic acid; antibiotics and antimicrobials; sebostats such as flavonoids; and bile salts such as scymnol sulfate and its derivatives, deoxycholate, and cholate. Anti-Wrinkle and Anti-Skin Atrophy Actives: examples of antiwrinkle and anti-skin atrophy actives include retinoic acid and its derivatives (e.g., cis and trans); retinol; retinyl esters; niacinamide, salicylic acid and derivatives thereof; sulfur-containing D and L amino acids and their derivatives and salts, thiols, hydroxy acids phytic acid, lipoic acid;lysophosphatidic acid, and skin peel agents (e.g., phenol and the like). Non-Steroidal Anti-Inflammatory Actives (NSAIDS): examples of NSAIDS include the following, propionic acid derivatives; acetic acid derivatives; fenamic acid derivatives; biphenylcarboxylic acid derivatives; and oxicams. Topical Anesthetics; examples of topical anesthetic drugs include benzocaine, lidocaine, bupivacaine, chlorprocaine, dibucaine, etidocaine, mepivacaine, tetracaine, dyclonine, hexylcaine, procaine, cocaine, ketamine, pramoxine, phenol, and pharmaceutically acceptable salts thereof. Artificial Tanning Agents and Accelerators; examples of artificial tanning agents and accelerators include dihydroxyacetaone, tyrosine, tyrosine esters such as ethyl tyrosinate, and phospho-DOPA. Sunscreen Actives; examples of sunscreens which are useful in the compositions of the present invention are those selected from the group consisting of 2-ethylhexyl p-methoxycinnamate, 2-ethylhexyl N,N-dimethyl-p-aminobenzoate, p-aminobenzoic acid, 2-phenylbenzimidazole-5-sulfonic acid, octocrylene, oxybenzone, homomenthyl salicylate, octyl salicylate, 4,4'-methoxy-t-butyldibenzoylmethane, 4-isopropyl dibenzoylmethane, 3-benzylidene camphor, 3-(4-methylbenzylidene) camphor, titanium dioxide, zinc oxide, silica, iron oxide and mixtures thereof. Other known active agents such as antibiotics or antiseptics may also be used.

The oil contaminable layer agents can also comprise a wide range of other components which can provide skin benefits or aesthetics, or modify the skin or modify the other components of the layer. Nonlimiting examples include essential oils, skin sensates, skin soothing agents, fillers, abrasives, absorbents, anticaking agents, antioxidants, vitamins, binders, biological additives, buffering agents, bulking agents, surfactants, chelating agents, pigments or colorants, cosmetic astringents, cosmetic biocides, cosmetic powders, denaturants, astringents, external analgesics, fragrance components, humectants, opacifying agents, pH adjusters, preservatives, propellants, reducing agents and skin cleansing agents.

Preferably, skin cleansing agents comprise one or more surfactant. The surfactants are preferably lathering surfactants. As used herein, "lathering surfactant" means a surfactant which when combined with water and mechanically agitated generates a foam or lather. A wide variety of lathering surfactants are useful herein and include those selected from the group consisting of anionic lathering surfactants, nonionic lathering surfactants, cationic lathering surfactants, amphoteric lathering surfactants, and mixtures thereof. The surfactants can comprise the oil contaminable layer (in which case it is generally dry) or be incorporated into a macroporous substrate in either a wet or dry form.

The porous oil absorbent film can also be directly joined to a nonwoven or like macroporous substrate subject to oil contamination. These macroporous materials are oil contaminable. This is preferably a low basis weight nonwoven web, generally from 10 to 100 gm/m$^2$, preferably 10 to 50 gm/m$^2$, which web can be contaminated by oil. By macroporous it is meant a porous material having an average pore size of from about 10 to 300 microns, preferably 10 to 200 microns, most preferably 10 to 100 microns. Suitable nonwoven webs are coherent webs of fibers such as spunlace webs, carded webs or spun fiber webs like spunbond or meltblown webs. Particularly preferred are meltblown webs formed of thermoplastic microfibers. The macroporous web can be hydrophobic or hydrophilic depending on the desired end use. A representative apparatus useful for preparing a meltblown web is described in Wente Van A., "Superfine Thermoplastic Fibers" in *Industrial Engineering Chemistry*, Vol. 48, p. 1342 et seq. (1956), or in Report No. 4364 of the Naval Research Laboratories, published May 25, 1954, entitled "Manufacture of Superfine Organic Fibers", by Wente, V. A.; Boone, C. D.; and Fluharty, E. L. Modifications to this basic design are discussed in U.S. Pat. Nos. 4,818,463; 3,825,379; 4,907,174 and 4,986,743. A polymer is introduced to a set of side-by-side die orifices and a central die cavity from a melt extruder. The fiber forming thermoplastic polymer is extruded from the die orifices into an attenuating airstream of heated air. This attenuating airstream is maintained at high velocities and exits from orifices or slots on either side of the set of die orifices. The high-velocity air is generally supplied to slots from two peripheral cavities. The heated air is generally about the temperature of the polymer melt or higher (e.g., 20 to 30° C. above the melt temperature). The fibers exiting from the die orifices are attenuated by the high velocity heated air from slots and are collected on collector, such as a belt, at a distance from the die. The collector distance is generally from 10 to 25 cm with different preferred distances for different polymers depending on the crystalline behavior of the polymer, how rapidly it is quenched to a totally non-tacky condition or other process conditions.

The webs are formed of fiber-forming thermoplastic materials, which materials include, for example, polyolefins, such as polyethylene, polypropylene or polybutylene; polyesters, such as polyethylene terephthalate or polybutylene terephthalate; polyurethanes or polyamides such as nylon 6 or nylon 66. The microfibers preferably have an average diameter of less than 50 micrometers, preferably with an average diameter of 10 micrometers or less. Smaller average fiber diameters may be obtained with smaller diameter orifices and/or by decreasing the polymer flow rate or by increasing gas withdrawal behind the collector.

A nonwoven layer can be intermittently joined to the porous film wipe material by patterned or randomly deposited adhesive, intermittent thermal or ultrasonic bonding or by directly forming the film on the nonwoven, or the nonwoven on the film. If the porous film is formed on the nonwoven then the nonwoven generally must be extensible so as to allow formation of the porous structure by orientation of the film. If the film is thermally bonded to the nonwoven or other macro-porous web, the bond area is generally less than 50 percent, preferably less than 25 percent and greater than 1 percent. Active or skin modifying agents as discussed above can be incorporated into the nonwoven web by conventional means such as coating, adhesives or binders or mechanical entrapment in the web structure. The active or skin modifying agents can be dried if applied out of solvent or could be wet, such as by not evaporating solvent, or rewet with a suitable solvent. If the nonwoven is wet, the package must be resealable to prevent evaporation or the wipes are packaged in individual disposable packages.

EXAMPLES

Test Methods

Oil Retention

It is important for a facial wipe to have good oil retention capability. A user of the wipe will typically press the wipe against the skin, for example to deliver an ingredient from the wipe to the skin. If all or part of the absorbed oil is released from the wipe, this oil is returned back to the skin or is spread on the users' fingers or hands. The oil can also interfere with the transfer, efficacy and functioning of ingredients or actives to be delivered to the skin or hair. The ability of the wipes to retain the oil that is absorbed during the wiping of one's face was determined using the following procedure. A 2 cm by 2 cm piece of the wipe was measured for thickness and weight. The sample was placed in a mineral oil bath for 1 minute after which it was removed using a tweezers and allowed to drip via gravity and gently wiped on both faces with a paper tissue to remove any surface oil and then weighed to determine how much oil the sample had absorbed and is reported in Table 1 as Oil Absorbed (gram of oil per gram of dry sample basis). The sample was then placed directly under a 2 cm by 2 cm steel plate. A 2000 gram weight was placed on the steel plate for 1 minute to simulate the finger pressure that might be used during use of the wipe, after which time the sample was removed and weighed. The % Oil Retention was calculated by taking the difference of the sample weight before and after, subtracting the difference from 1, then dividing the result by the initial wet sample weight, and then multiplying by 100 to express the result as a percentage.

Skin Contamination

A visual determination was made as to whether oil contaminated the users fingers while using the non-oil absorbent side of the laminated or coated wipe materials. A drop of mineral oil was placed on the oil absorbent side (microporous film) of the wipe or the non-coated side of the wipe and allowed to soak in for one minute after which the excess was wiped away with a paper tissue. The non-oil absorbent side was then pressed against the skin of the inner arm of a human test subject using a pressure of approximately 100 grams/cm$^2$ to deliver the ingredient or to remove sweat. A 'Yes' indicates that oil was observed on the fingers after wiping. A 'No' indicates that no oil was observed after wiping.

Powder Transfer

A visual determination was made as to the quality of the transfer of powder for the powder coated materials. A drop of mineral oil was placed on the oil absorbent side (microporous film) of the wipe and allowed to soak in for one minute after which the excess was wiped away. Using finger pressure, the powder-coated side of the samples were then (using approximately 100 grams/cm$^2$ of pressure in the oil saturated region) wiped against a black cardboard substrate. The samples of the invention exhibited good even powder delivery with no streaking or smearing because the absorbed oil was well retained in the film during use. Materials with poor oil retention exhibited poor powder transfer with significant streaking and smearing due to oil contamination from the film.

Microporous Substrates

3M Porous Film

A microporous film was prepared similar to that described in PCT application WO 99/29220 Example 1, having the following composition: 5D45 polypropylene (62.9%, Union Carbide Co.), mineral oil (35.0%, white oil #31, Amoco Oil & Chemical Co.), #7 green copper phthalocyanine pigment (1.0%, CI #74260, Sun Chemical Co.). The microporous film had a thickness of 37 microns and a void content of 30%.

Amoco Porous Film 50 micron Aptra® Classic, BP Amoco, Atlanta, Ga.

Teflon Porous Film 44 micron PTFE Tetratec. Corp, Feasterville, Pa.

EXAMPLES

Example 1

A facial wipe was prepared by thermally laminating the microporous film described above to a 30 grams/meter$^2$ polypropylene melt-blown microfiber nonwoven web. Melt-blown hydrophilic webs useful in the present invention can be prepared as described in U.S. Pat. Nos. 3,849,241 (Butin et al.) and 5,064.578 (Insley et al.), or from microfiber webs containing particulate matter such as those disclosed, for example, in U.S. Pat. Nos. 3,971,373 (Braun), 4,100,324 (Anderson), and 4,429,001 (Kolpin et al.). In particular, a process similar to that described in Wente, Superfine Thermoplastic Fibers, 48 INDUS. ENG'G CHEM. 1342(1956), or in Wente et al., MANUFACTURE OF SUPERFINE ORGANIC FIBERS, (Naval Research Laboratories Report No. 4364, 1954), can be used for the preparation of the nonwoven webs of this invention. However, because of the potential for thermal instability of the surfactants employed in the invention as melt additives, it is preferable to incorporate the surfactants into the polymer melt just before exiting the die, such as is generally described in U.S. Pat. Nos. 4,933,229 (Insley et al.) and 5, 064,578 (Insley et al.). The nonwoven web was prepared using Escorene 3746G polypropylene available from Exxon Chemical Company and a surfactant composition consisting of 70% Lauricidin (glycerol monolaurate) and 30% Span 20 (sorbitol monolaurate). A 5% round, point bonding pattern was used to laminate the microporous film to the nonwoven web at a temperature of 66° C. and nip pressure of 3.5 kg/cm$^2$. The resulting laminate functions as a dry oil and sweat facial wipe where the user can remove skin oil with the microporous film side and turn the wipe around and use the nonwoven side to remove sweat.

Example 2

A facial wipe was prepared by thermally laminating the microporous film described above to a 34 grams/meter$^2$ spunlace nonwoven web made from 70% rayon fibers and 30% polypropylene fibers. The nonwoven side of the laminate was impregnated with a water/ethanol (15%) mixture by spraying. A 5% round, point bonding pattern was used to laminate the microporous film to the nonwoven web at a temperature of 66° C. and nip pressure of 3.5 kg/cm$^2$. The resulting laminate functions as a wet oil and sweat facial wipe where the user can remove skin oil with the microporous film side and turn the wipe around and use the nonwoven side to remove sweat and dirt. The nonwoven web could be loaded with dry or wet fragrances, cleansers, sensates, active agents, etc. for added functionalities.

Example 3

A facial wipe was prepared as in Example 1 using the following dry ingredients at 9% solids in isopropyl alcohol:

34.06% Sericite TKC (aluminum potassium silicate)
17.03% Talc JA-46R (hydrous magnesium silicate)
8.55% Urethane D-400 powder (hexamethylene diisocyanate/trimethylol hexyllactone)
0.20% Red Tarox ferric oxide pigment
0.40% Yellow Tarox ferric oxide pigment
0.02% Black Tarox ferric oxide pigment
39.74% Rheodole Super SP-L10 (sorbitol monolaurate)

The coated microporous film was then allowed to air dry for 24 hours before testing. The dry powder weight on the film was 2.50 grams/meter$^2$. The resulting wipe can be used to absorb sebum and deliver a powder to the skin for a matte look. The powder can be formulated to deliver added cosmetic and active ingredients including sebum absorbing or controlling agents.

Example 4

To demonstrate the use of the wipes of the invention as a substantially dry cleansing wipe, a facial wipe was coated as in Example 3 using the following cleansing formulation at 20% solids in water:

20% Cocamidopropyle betaine (Velvetex BA-35, Henkel)

The coated microporous film was then allowed to air dry for 24 hours before testing. The dry soap weight on the film was 1.50 grams/meter$^2$. The resulting substantially dry wipe is readily activated by the consumer by wetting with water.

Comparative Examples

C1: Commercially available facial oil removing paper tissue available from the Kose Co. of Japan.
C2: Commercially available facial oil removing rice paper tissue available from the Body-Shop Co. of Japan.
C3: Commercially available facial oil removing tissue available from the Kao Co. of Japan as Biore Oil Control and Refreshing Sheets consisting of a laminate of a nonwoven oil absorbent layer, a barrier film and hydrophilic wet nonwoven layer.
C4: Commercially available powder coated facial oil removing paper tissue available from Estee Lauder as Oil-Control Blotting Paper.

C5: Commercially available powder coated facial oil removing paper tissue available from Shiseido as Pureness Oil-Blotting Paper.

Table 1 below shows the oil absorption and retention properties of three commercially available microporous films that are useful as substrates for the coatings or laminates of the invention.

TABLE 1

| Microporous Film | Thickness (microns) | Dry Weight (grams) | Oil absorbed (gram/gram) | % Oil Retention |
|---|---|---|---|---|
| 3 M film | 41 | 24.6 | 0.45 | 87.4 |
| Amoco film | 50 | 27.8 | 0.73 | 94.6 |
| Teflon film | 44 | 13.4 | 2.75 | 87.1 |

Table 2 below shows the oil absorption and retention properties of the five commercially available facial wipes described above.

TABLE 2

| Material | Thickness (microns) | Dry Weight (grams) | Oil absorbed (gram/gram) | % Oil Retention | Skin Contamination (yes/no) | Powder Transfer (good/poor) |
|---|---|---|---|---|---|---|
| C1 | 24 | 15.5 | 0.40 | 19.5 | Yes | |
| C2 | 37 | 16.9 | 0.53 | 27.1 | Yes | |
| C3 | 51 | 27.4 | 0.71 | 25.6 | Yes | |
| C4 | | | | | Yes | Poor |
| C5 | | | | | Yes | Poor |

Table 3 below shows four examples of the wipes of the invention and their skin contamination and powder transfer attributes.

TABLE 3

| Example | Skin Contamination (yes/no) | Powder Transfer (good/poor) |
|---|---|---|
| 1 | No | |
| 2 | No | |
| 3 | No | Good |
| 4 | No | |

The above tables show that facial wipes containing microporous film as the oil absorbing layer have good oil absorption capacity per unit volume and high oil retention capacity when compared to paper and nonwoven oil absorbent products. The wipes of the invention are well suited to deliver a wide variety of ingredients to the users skin without contamination of the delivered ingredient via oil from previously cleaned skin or the users hands or fingers, such as powders and cleansers. The wipes of the invention are well suited to deliver a wide variety of ingredients, in coated or laminated form, to the users skin without contamination of the delivered ingredient or added layers via oil from previously cleaned skin. Contamination of the users hands or fingers is also prevented since the wipes of this invention have high oil retention capability.

We claim:

1. A package of multiple oil absorbing wipes suitable for wiping a users skin or hair, the wipes comprising an oil absorbing porous film of a thermoplastic material having a transparency of less than 65 wherein said porous film changes transparency when loaded with oil, said porous film having directly on one face an oil contaminable layer, without any intermediate oil impermeable layer or film, and said porous film having a percent oil retention of from 50 to 100 percent.

2. The package of oil absorbing wipes of claim 1 wherein the oil contaminable layer is a macroporous layer.

3. The package of oil absorbing wipes of claim 1 wherein the oil contaminable layer is a pattern coated layer.

4. The package of oil absorbing wipes of claim 2 wherein the oil contaminable layer is a dry powder.

5. The package of oil absorbing wipes of claim 2 wherein the oil contaminable layer is a nonwoven web.

6. The package of oil absorbing wipes of claim 5 wherein the nonwoven web has a basis weight of from 10 to 100 g/m$^2$ and is intermittently bonded to the wipe.

7. The package of oil absorbing wipes of claim 6 wherein the bond area is from 1 to 50 percent.

8. The package of oil absorbing wipes of claim 6 wherein the nonwoven web is a melt spun fiber web.

9. The package of oil absorbing wipes of claim 4 wherein the dry powder is a cosmetic powder.

10. The package of oil absorbing wipes of claim 1 wherein the package contains at least 10 to 1000 wipes in an overlying arrangement.

11. The package of oil absorbing wipes of claim 1 wherein the individual wipes are from 10 to 100 cm$^2$.

12. The package of oil absorbing wipes of claim 1 wherein the oil contaminable layer is a skin cleansing agent.

13. The package of oil absorbing wipes of claim 1 wherein interstitial volume per unit area of said porous stretched film is in the range of 0.0001–0.005 cm$^3$ as calculated by the following equation:

interstitial volume per unit area=[film thickness ($cm$)×1 ($cm$)×void content (%)]/100 (where the void content is the percentage of voids in the porous film).

14. The package of oil absorbing wipes of claim 13 wherein the void content of said porous stretched film is in the range of 5–50% and the film thickness is in the range of 5–200 μm.

15. The package of oil absorbing wipes of claim 13 wherein the porous film comprises thermoplastic porous film containing from 20 to 60 percent filler.

16. The package of oil absorbing wipes of claim 15 wherein the porous film contains a non-particulate filler.

17. The package of oil absorbing wipes of claim 16 wherein the non-particulate filler is mineral oil.

18. The package of oil absorbing wipes of claim 12 wherein the porous film voids have an average size is in the range of from 0.2 to 5.0 microns (μm).

19. The package of oil absorbing wipes of claim 13 wherein the interstitial volume per unit area is from 0.0002 to 0.001 cm$^3$.

20. The package of oil absorbing wipes of claim 8 wherein the nonwoven web is a meltblown web of thermoplastic fibers.

21. The oil absorbing wipe material claim 20 wherein the thermoplastic fibers are polyolefin microfibers.

22. The package of oil absorbing wipes of claim 20 wherein the thermoplastic fibers are polypropylene microfibers.

23. The package of oil absorbing wipes of claim 12 wherein the skin cleansing agent is a lathering surfactant.

24. The package of oil absorbing wipes of claim 2 wherein the macroporous layer contains an active agent.

25. The package of oil absorbing wipes of claim 24 wherein the macroporous layer is a nonwoven fibrous layer having an average pore size of from 10 to 300 microns.

26. The package of oil absorbing wipes of claim 25 wherein the active agent is a lathering surfactant.

27. The package of oil absorbing wipes of claim 26 wherein the lathering surfactant is wet.

28. The package of oil absorbing wipes of claim 27 wherein the wipe is contained in an individual disposable package.

* * * * *